(12) United States Patent
Makinoshima et al.

(10) Patent No.: US 12,682,134 B2
(45) Date of Patent: Jul. 14, 2026

(54) PREDICTION PROGRAM, PREDICTION METHOD, AND PREDICTION DEVICE

(71) Applicant: Fujitsu Limited, Kawasaki (JP)

(72) Inventors: Fumiyasu Makinoshima, Kawasaki (JP); Yusuke Oishi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 938 days.

(21) Appl. No.: 17/970,043

(22) Filed: Oct. 20, 2022

(65) Prior Publication Data

US 2023/0195964 A1 Jun. 22, 2023

(30) Foreign Application Priority Data

Dec. 17, 2021 (JP) ................................. 2021-205347

(51) Int. Cl.
 *G06F 30/20* (2020.01)
 *G06Q 10/04* (2023.01)
 *G06F 119/02* (2020.01)

(52) U.S. Cl.
 CPC ............. *G06F 30/20* (2020.01); *G06Q 10/04* (2013.01); *G06F 2119/02* (2020.01)

(58) Field of Classification Search
 CPC .. G06F 30/20; G06F 2119/02; G06F 16/9537; G06Q 10/04; G06Q 10/025; G06Q 10/047; G06Q 10/06312
 See application file for complete search history.

(56) References Cited

U.S. PATENT DOCUMENTS

| | | | |
|---|---|---|---|
| 2011/0191078 A1* | 8/2011 | Davidich | G06F 30/13 703/6 |
| 2018/0197017 A1* | 7/2018 | Mansour | G06V 20/53 |
| 2020/0250586 A1 | 8/2020 | Kajihara et al. | |
| 2020/0262680 A1* | 8/2020 | Fujiwara | B66B 5/0031 |
| 2021/0158394 A1* | 5/2021 | Fowe | G06Q 30/0251 |
| 2022/0207220 A1* | 6/2022 | Matei | G09B 9/003 |
| 2022/0333935 A1* | 10/2022 | Adachi | G01C 21/3453 |
| 2023/0359783 A1* | 11/2023 | Ning | G06F 30/13 |

FOREIGN PATENT DOCUMENTS

| | | |
|---|---|---|
| JP | 2017-49954 A | 3/2017 |
| JP | 2018-136861 | 8/2018 |
| JP | 2019-101860 A | 6/2019 |
| JP | 2019-197372 | 11/2019 |

(Continued)

OTHER PUBLICATIONS

JPOA—Japanese Office Action mailed Apr. 22, 2025 for corresponding Japanese Patent Application No. 2021-205347 with machine English translation (10 pages).

(Continued)

*Primary Examiner* — Brian W Wathen
(74) *Attorney, Agent, or Firm* — Fujitsu Intellectual Property Center

(57) ABSTRACT

A non-transitory computer-readable storage medium storing a prediction program that causes at least one computer to execute a process, the process includes simulating a flow of people based on a plurality of behavior intentions of people; evaluating the simulated flow based on observation data of the flow of people; and predicting the flow of people based on an evaluation result of the simulated flow of people.

3 Claims, 9 Drawing Sheets

(56)                    References Cited

FOREIGN PATENT DOCUMENTS

WO        2018/138803 A1      8/2018

OTHER PUBLICATIONS

Extended European Search Report dated Apr. 26, 2023 for corresponding European Patent Application No. 22201857.4, 9 pages.
Malleson, Nick et al., "Simulating Crowds in Real Time with Agent-Based Modelling and a Particle Filter", arxiv.org, Cornell University Library 201 Olin Library Cornell University Ithaca, NY 14853, Sep. 20, 2019, XP081479600, 18 pages.
Ryo, Nishida et al., "Construction of a Route Choice Model for Application to a Pedestrian Flow Simulation", 2019 IEEE International Conference on Pervasive Computing and Communications Workshops (Percom Workshops), IEEEE, Mar. 11, 2019, pp. 614-619, XP033558216, DOI: 10.1109/PERCOMW.2019.8730657 [retrieved on Jun. 4, 2019].
Anonymous, "Data assimilation—Wikipedia", Dec. 10, 2021, XP093039961, Retrieved from the Internet: URL: https://en.wikipedia.org/w/index.php?title=Data_assimilation&oldid=1059602269 [retrieved on Apr. 18, 2023], pp. 1-11.

* cited by examiner

PREDICTION PROGRAM, PREDICTION METHOD, AND PREDICTION DEVICE

CROSS-REFERENCE TO RELATED APPLICATION

This application is based upon and claims the benefit of priority of the prior Japanese Patent Application No. 2021-205347, filed on Dec. 17, 2021, the entire contents of which are incorporated herein by reference.

FIELD

The embodiments discussed herein are related to a prediction program, a prediction method, and a prediction device.

BACKGROUND

In situations where a flow of people is concentrated such as when an event is held or at the time of evacuation when a disaster occurs, congestion occurs, and accidents due to overcrowding or human damage due to delays of evacuation may occur. Therefore, if it is possible to predict a possible congestion situation in advance and examine countermeasures before an event occurs, this avoids accidents or human damages and reduces risks. Therefore, it is important to predict a future flow of people.

As a prior art, an agent-based simulation that models movements of individual people predicts a state of a flow of people in a phenomenon that has not been experienced before by simulating movements and interferences as assuming a behavior of each pedestrian and predicting a flow of people.

Furthermore, a method (may be referred to as "data assimilation") is considered that improves simulation prediction accuracy by incorporating observation data into simulations such as weather forecast, and application of the data assimilation to the prediction of the flow of people is considered.

Japanese Laid-open Patent Publication No. 2019-101860 and International Publication Pamphlet No. WO 2018/138803 are disclosed as related art.

SUMMARY

According to an aspect of the embodiments, a non-transitory computer-readable storage medium storing a prediction program that causes at least one computer to execute a process, the process includes simulating a flow of people based on a plurality of behavior intentions of people; evaluating the simulated flow based on observation data of the flow of people; and predicting the flow of people based on an evaluation result of the simulated flow of people.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Because the traditional agent-based simulation is so-called What-if scenario analysis and it is not known whether or not a simulation state actually occurs, the traditional simulation does not predict an actual future crowd flow. Furthermore, current data assimilation for prediction of a flow of people is limited to tracking a position of an individual person and cannot be applied to the prediction of the flow of people.

In one aspect, an object is to provide a prediction program, a prediction method, a prediction device, and a prediction system that improve accuracy of predicting a flow of people.

In one aspect, it is possible to improve accuracy of predicting a flow of people.

Hereinafter, embodiments of a prediction program, a prediction method, a prediction device, and a prediction system according to the present embodiment will be described in detail with reference to the drawings. Note that the embodiments do not limit the present disclosure. Furthermore, the individual embodiments may be appropriately combined with each other within a range without inconsistency.

First Embodiment

Figure 1:
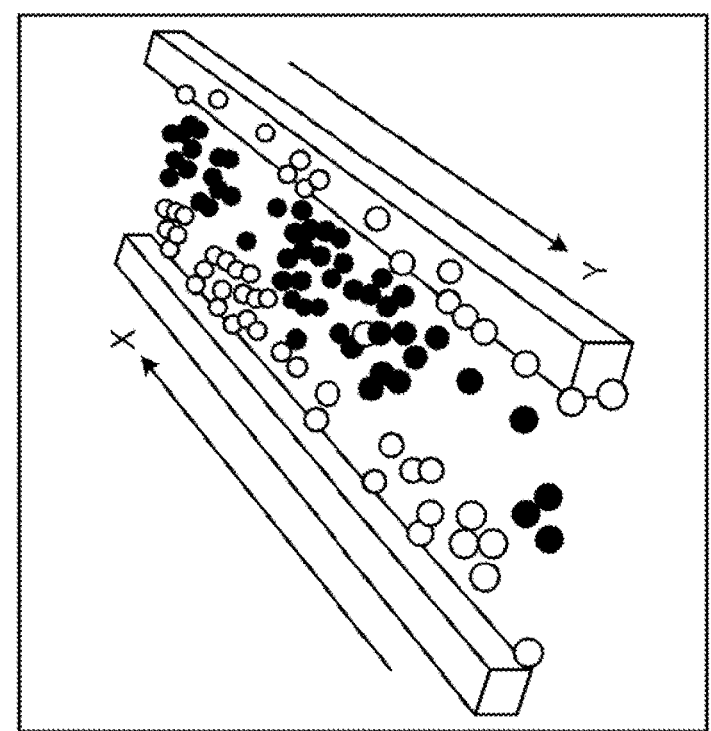
FIG. 1 is a diagram for explaining a flow of people and a behavior intention of a person.

First, a flow of people and a behavior intention of a person will be described with reference to FIG. 1. Note that there is a case where the behavior intention of the person is simply referred to as a "behavior intention". FIG. 1 is a diagram for explaining a flow of people and a behavior intention of a person. The left side of FIG. 1 illustrates a flow of people in a passage in the X or Y direction. On the other hand, the right side of FIG. 1 illustrates a flow of people in an area toward an exit A or B. In this way, in a situation where it is desired to predict a flow of people, there are many situations where the behavior intentions of the people are limited to moving toward XX or the like. Note that, in a station, a more specific behavior intention of the person includes, for example, whether or not to change to the xx line, to change to the yy line, to go to the zz exit, or the like, and in a situation at the time of evacuation, to evacuate from which exit, when to start to move, or the like. However, the behavior intention is not limited to these. Furthermore, for example, there may be a case where a plurality of behavior intentions such as moving toward an exit 60 seconds later is combined into a single behavior intention.

When a behavior intention of a person is assumed as $\theta$, the behavior intention $\theta$ cannot be observed from a flow of people. However, for example, even if the flow of people is complicated, it can be said that the flow of people is formed by superposition of behaviors of individuals who behave based on some simple behavior intentions $\theta$. For example, in a station, a flow of people is formed by a person who behaves based on a behavior intention $\theta_1$ to change to the xx line, a person who behaves based on a behavior intention $\theta_2$ to change to the yy line, . . . , and a person who behaves based on a behavior intention $\theta_z$. Then, although each behavior intention $\theta$ cannot be observed and is unknown, a behavior as a result of each behavior intention $\theta$ can be observed by tracking each person. For example, by tracking the person who behaves based on the behavior intention $\theta_1$ to change to the xx line, a behavior of the person for moving toward the Z direction in a passage can be observed. Because the behavior for moving toward the Z direction that can be observed is a behavior as a result of the behavior intention $\theta_1$, if the behavior intention $\theta$ that cannot be observed can be derived from the observed behavior, a future flow of people can be predicted through simulation based on the behavior intention. Furthermore, because the agent-based simulation can be performed faster than the real time, it is possible to predict the flow of people after observation data of the behavior of the person and the flow of people is obtained so as to control the flow of people.

Therefore, in the present embodiment, one of objects is to simulate a flow of people from a plurality of behavior intentions of people, estimate a behavior intention by evaluating the simulation result with observation data, and predict a flow of people based on the estimation result.

[System Configuration of Prediction System 1]

Figure 2:
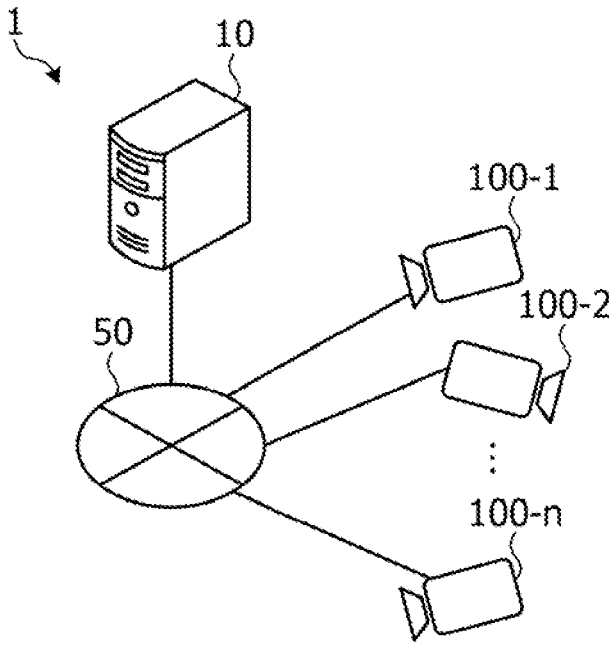
FIG. 2 is a diagram illustrating an exemplary configuration of a prediction system 1 according to a first embodiment.

FIG. 2 is a diagram illustrating an exemplary configuration of a prediction system 1 according to a first embodiment. As illustrated in FIG. 2, the prediction system 1 is a system in which a prediction device 10 and observation devices 100-1 to 100-*n* (n is arbitrary integer. hereinafter, collectively referred to as "observation device 100") are communicably connected to each other via a network 50.

As the network 50, for example, various communication networks such as an intranet used in a predetermined area such as a station can be adopted regardless of whether it is wired or wireless. Furthermore, the network 50 may be configured by, for example, the intranet and the Internet configured via a network device such as a gateway or other devices (not illustrated), not a single network.

The prediction device 10 receives data observed by the observation device 100 from the observation device 100. Here, although the observed data may be, for example, a video or an image captured by the observation device 100 or a density map of a flow of people at a predetermined time generated from the video or the image, the observed data is not limited to these. The prediction device 10 simulates a flow of people from a plurality of behavior intentions of a person and evaluates a simulation result with the observation data received from the observation device 100 so as to estimate a behavior intention and predict a flow of people based on the estimation result.

The observation device 100 is a device that observes a flow of people in a predetermined area and is, for example, a camera device. Furthermore, although the prediction system 1 illustrated in FIG. 2 includes the plurality of observation devices 100, the number of observation devices 100 may be one. The observation device 100, for example, observes a flow of people every second and generates observation data. Furthermore, the observation device 100 can acquire positional information of the flow of people with the GPS or the like.

[Functional Overview]

Figure 3:
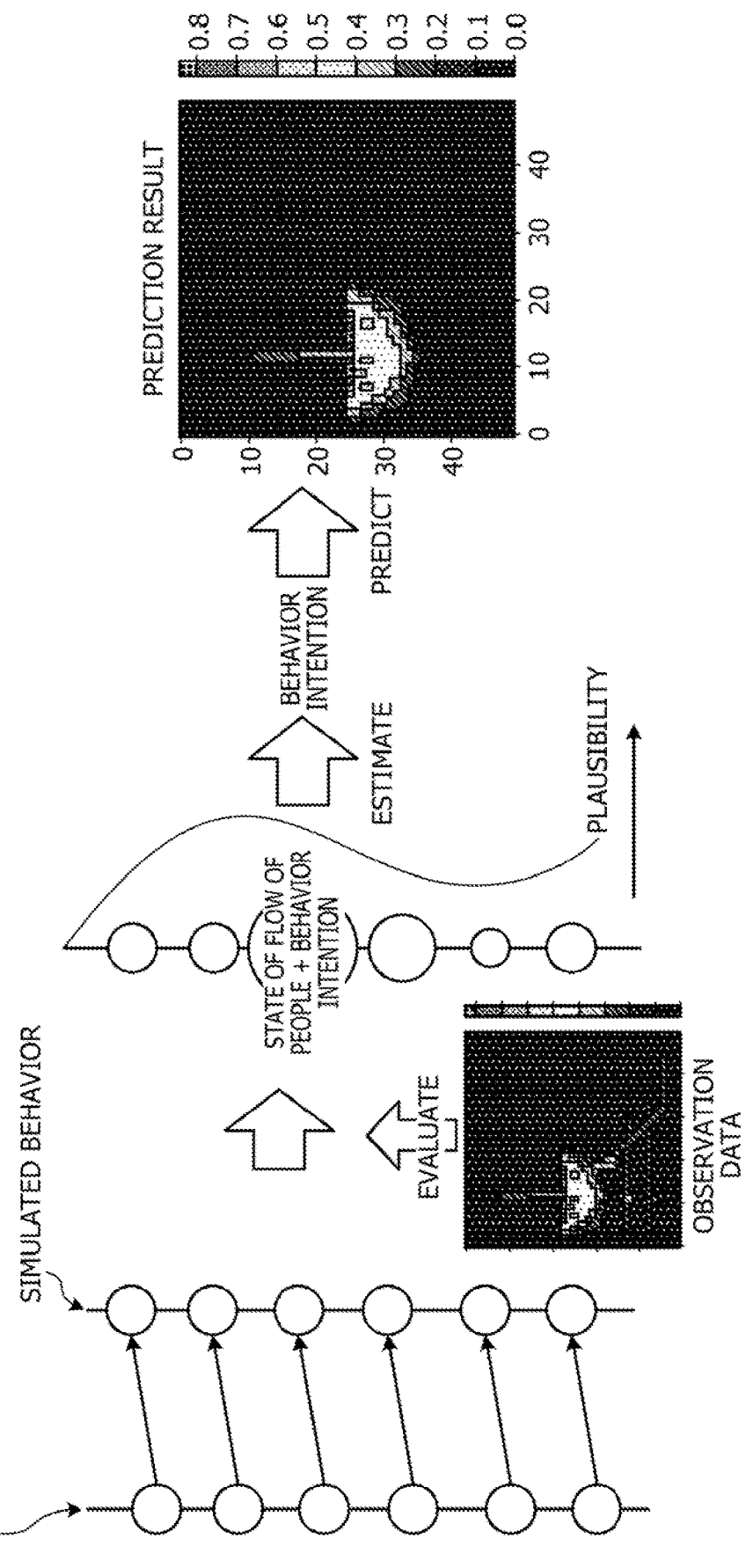
FIG. 3 is a diagram illustrating an example of prediction of a flow of people according to the first embodiment.

FIG. 3 is a diagram illustrating an example of prediction of a flow of people according to the first embodiment. As illustrated in FIG. 3, for example, the prediction device 10 simulates a behavior of each person based on various, for example, 500 patterns of behavior intentions $\theta$ for people in a predetermined area such as a station or a passage. Since a set of the simulated behaviors of the individual people forms a flow of people, the prediction device 10 evaluates the simulated flow of people using the observation data of the flow of people in the predetermined area obtained by the observation device 100. Although details will be described later, for example, the observation data is a density map of a flow of people at a predetermined time, and the prediction device 10 can evaluate the simulated flow of people by converting the simulated flow of people into a density map in the same format and comparing both density maps.

Then, the prediction device 10 estimates a behavior intention $\theta$ that is close to actual observation data and is a base of the simulated flow of people, from the evaluation result of the simulated flow of people and predicts a future flow of people based on the estimated behavior intention $\theta$. For example, such prediction of the flow of people estimates a behavior intention $\theta$ indicating a percentage of people who want to move to the left side in a passage in the right-left direction and further simulates and predicts a flow of people based on the estimated behavior intention $\theta$. Note that the estimation of the behavior intention and the simulation of the flow of people may be conducted, for example, using an algorithm or a simulation model of an existing technique such as particle filters.

[Functional Configuration of Prediction Device 10]

Figure 4:
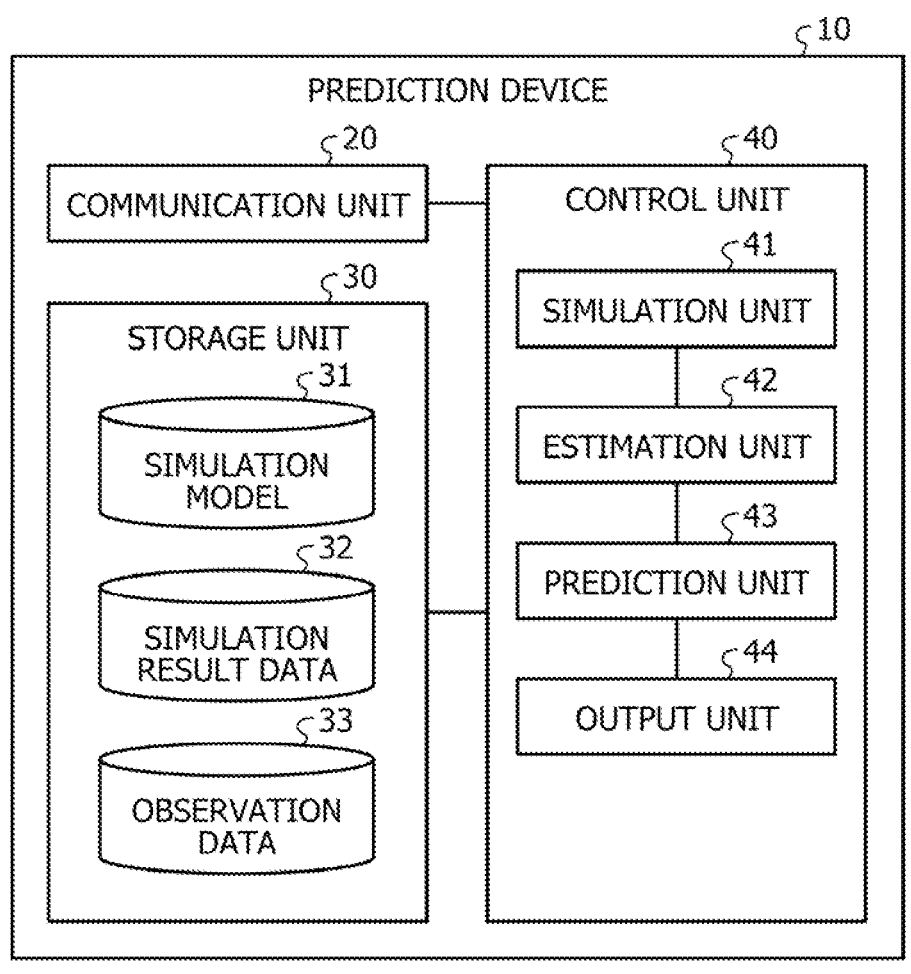
FIG. 4 is a diagram illustrating an exemplary configuration of a prediction device 10 according to the first embodiment.

Next, a functional configuration of the prediction device 10 that is an execution body according to the present embodiment will be described. FIG. 4 is diagram illustrating an exemplary configuration of the prediction device 10 according to the first embodiment. As illustrated in FIG. 4, the prediction device 10 includes a communication unit 20, a storage unit 30, and a control unit 40.

The communication unit 20 is, for example, a processing unit that controls communication with the observation device 100 via the network 50 and is, for example, a communication interface such as a network interface card.

The storage unit 30 is an example of a storage device that stores various types of data and a program to be executed by the control unit 40, and is, for example, a memory, a hard disk, or the like. The storage unit 30 stores a simulation model 31, simulation result data 32, observation data 33, or the like.

The simulation model 31 is, for example, a model used to simulate a flow of people from a behavior intention of a person. In the present embodiment, by evaluating the flow of people simulated from the behavior intention of the person using the simulation model 31 with the observation data 33 and further simulating the flow of people with the simulation model 31 based on the evaluation result, prediction accuracy is improved. Note that the simulation model 31 may be created for each predetermined area such as a station or a passage or each predetermined scene such as a time when an event is held or evacuation when a disaster occurs.

The simulation result data 32 is, for example, data regarding the flow of people simulated based on the behavior intention of the person using the simulation model 31. Furthermore, the simulation result data 32 may include data regarding the flow of people that is further simulated based on the evaluation result with the observation data 33. Furthermore, the simulation result data 32 may be a density map of a flow of people predicted at a predetermined time.

For example, the observation data 33 is a video or an image of a predetermined area such as a station or a passage captured by the observation device 100 and a density map of a flow of people at a predetermined time generated from the video or the image. For example, the density map may be generated by receiving the underlying data from the observation device 100 by the prediction device 10 or the density map generated by the observation device 100 may be received by the prediction device 10.

Note that the various types of information described above stored in the storage unit 30 is merely an example, and the storage unit 30 may store various types of information other than the information described above.

The control unit 40 is a processing unit that controls the entire prediction device 10 and is, for example, a processor or the like. The control unit 40 includes a simulation unit 41, an estimation unit 42, a prediction unit 43, and an output unit 44. Note that each processing unit is an example of an electronic circuit included in a processor or an example of a process to be executed by the processor.

The simulation unit 41 simulates a flow of people based on a plurality of behavior intentions of people. Furthermore, the simulation unit 41 simulates a flow of people based on a behavior intention estimated by the estimation unit 42 based on the estimation result of the simulated flow of people. This is so-called re-simulation, and the prediction device 10 simulates a flow of people based on a predetermined behavior intention at the first time and simulates a flow of people based on the behavior intention estimated by the estimation unit 42 at the second and subsequent times. As a result, it is possible to perform plausible prediction and re-simulation based on the evaluation result with the observation data for the flow of people and to further improve the accuracy of predicting the flow of people.

The estimation unit 42 evaluates the simulated flow of people based on the observation data of the flow of people. This is, for example, processing for calculating a reciprocal of each error as a likelihood of the simulated flow of people based on the error between the observation data of the flow of people and the simulated flow of people. Note that, after generating a second density map from a position of each person in the simulated flow of people based on the observation data that is a first density map of people, the error may be calculated based on the first density map and the second density map. Then, the estimation unit 42 estimates the behavior intention that is close to the actual observation data of the flow of people and is the base of the simulated flow of people and a current state of the flow of people, based on the evaluation result of the simulated flow of people. Note that, as for the estimation of the behavior intention, for example, a plurality of behavior intentions that describes an actually-observed behavior is assumed, and these behavior intentions can be estimated. For example, in evacuation behavior prediction, the estimation unit 42 can estimate a percentage of people who select each of a plurality of exits as a behavior intention of evacuation destination tendency and a percentage of people who start to move at an elapsed time from a certain time or a predetermined time as a behavior intention of evacuation start tendency.

The prediction unit 43 simulates and predicts a flow of people based on the behavior intention estimated by the estimation unit 42 and the state of the flow of people. Note that the flow of people may be simulated by the simulation unit 41. Furthermore, the prediction unit 43 generates a density map for each elapsed time, for example, as a prediction result of the flow of people.

The output unit 44 outputs the flow of people predicted by the prediction unit 43 as the prediction result. Note that the prediction result may be output to another information processing device communicably connected to the prediction device 10 or a display device or the like communicably connected to the prediction device 10. Alternatively, the prediction result may be simply output to a log, an image file, or the like.

[Function Details]

The prediction processing of the flow of people for improving the accuracy of predicting the flow of people will be described in detail with reference to FIGS. 1, 3, and 5 to 7. Here, as a predetermined area where a flow of people to be predicted is generated, an area including exits A and B illustrated in the right side of FIG. 1 will be described as an example.

First, as described with reference to FIG. 3, the prediction device 10 simulates behaviors of individual people based on the various behavior intentions θ that are randomly set to people in the predetermined area, using the algorithm or the simulation model of the existing technique. Furthermore, the prediction device 10 converts positions of the individual people that are the simulation results into a density map (person/m²) in the same format as the observation data to be compared with the observation data. Then, when receiving the observation data that is obtained by observing the flow of people in the predetermined area from the observation device 100, the prediction device 10 evaluates the simulation result using the observation data.

Figure 5:
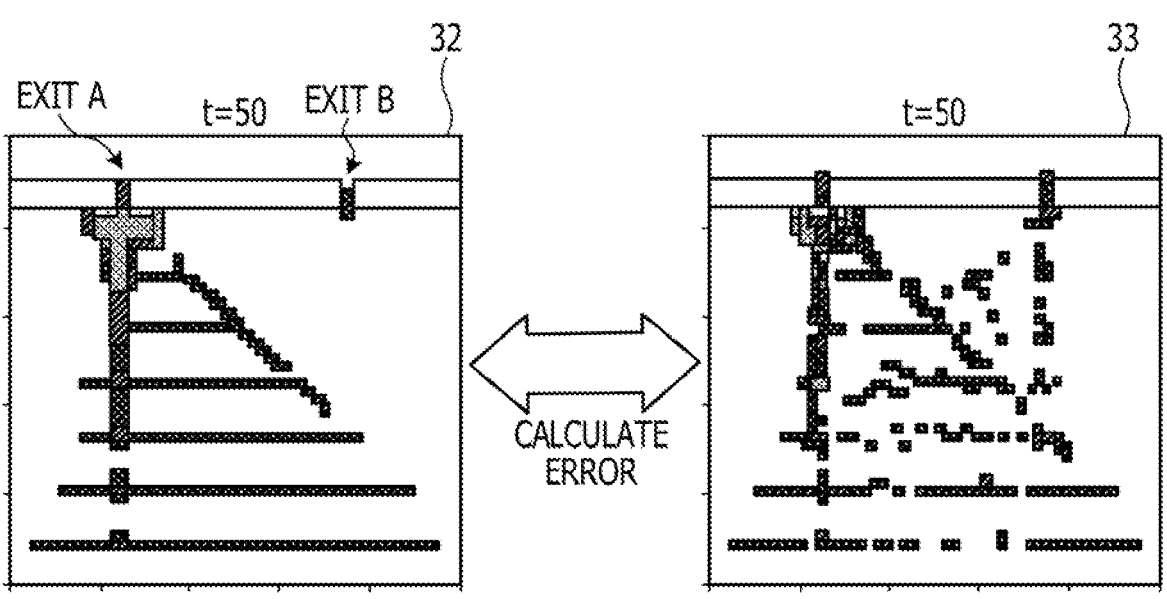
FIG. 5 is a diagram illustrating an example of evaluation of the flow of people according to the first embodiment.

FIG. 5 is a diagram illustrating an example of evaluation of a flow of people according to the first embodiment. In the left side of FIG. 5, the simulation result data 32 is illustrated that indicates a simulation result of a flow of people in a predetermined area after an elapsed time of 50 seconds from start of the observation of the flow of people by the observation device 100. On the other hand, in the right side of the drawing, the observation data 33 of the flow of people after the elapsed time of 50 seconds from the start of the observation of the flow of people by the observation device 100 is illustrated.

As illustrated in FIG. 5, the simulation result data 32 and the observation data 33 can be indicated by the density maps in the same format, and the prediction device 10 calculates an error between both density maps and evaluates the simulation result data 32. For example, it is indicated that, as the error between the simulation result data 32 and the observation data 33 is smaller, the prediction device 10 can accurately predict the actual positions of the individual people and the flow of people as a set of these.

As an example of an evaluation value of the simulation result data 32, the prediction device 10 calculates, for example, a likelihood by setting an error total amount of both density maps as a reciprocal. As a result, as the error is smaller, the likelihood is higher, and it can be evaluated that the prediction device 10 can more accurately predict the flow of people as the likelihood is higher.

Then, the prediction device 10 estimates the current state of the flow of people and the behavior intention θ based on the likelihood, from a set of the plurality of pieces of simulation result data 32 obtained by performing simulation based on various behavior intentions θ. The estimated state of the flow of people and the estimated behavior intention θ are used for next simulation.

In this way, the prediction device 10 evaluates the prediction simulation result of the flow of people and can improve the accuracy of predicting the flow of people by repeating the estimation of the current flow of people and the behavior intention θ from the simulation close to the observation data of the actual flow of people and the simulation based on the estimation results.

Figure 6:
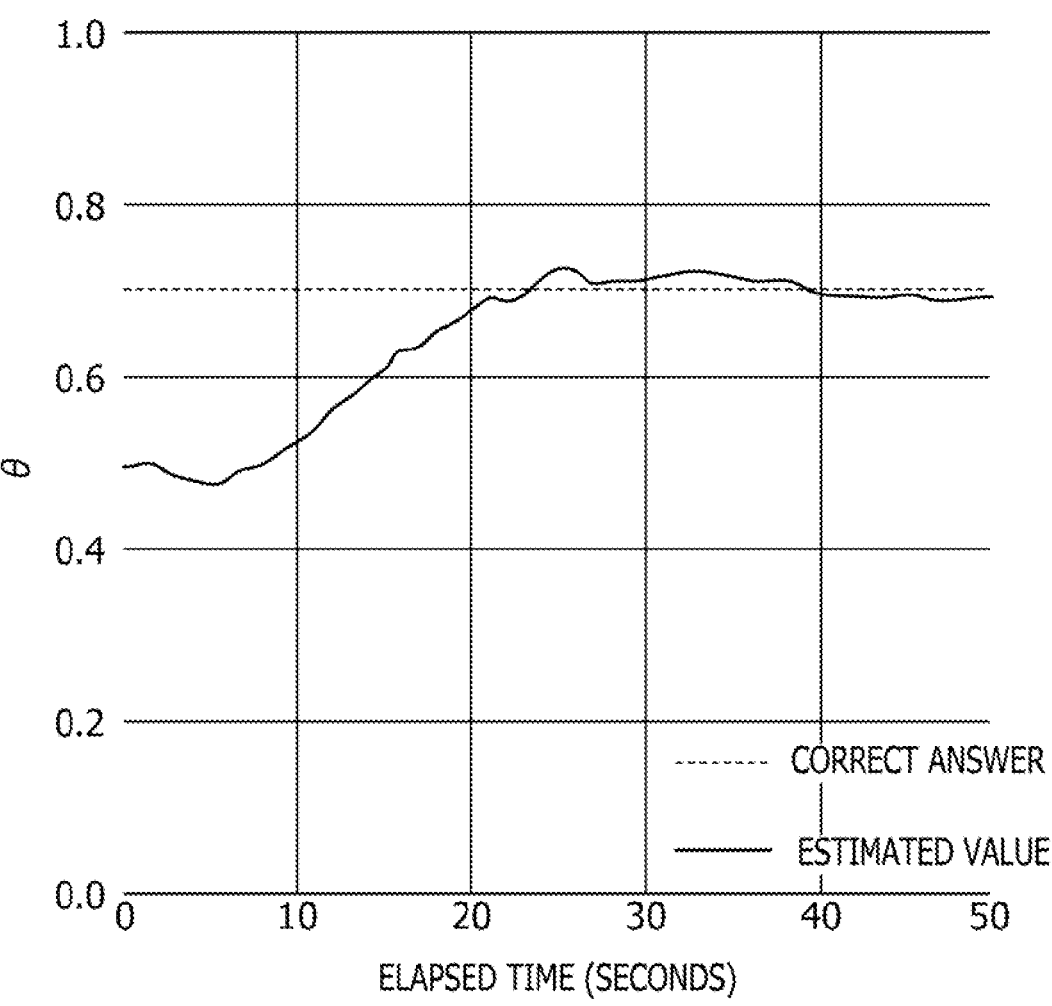
FIG. 6 is a diagram illustrating an example of a behavior intention estimation result according to the first embodiment.

FIG. 6 is a diagram illustrating an example of a behavior intention estimation result according to the first embodiment. FIG. 6 is a graph illustrating a transition of an estimation result of a behavior intention θ in a case where a behavior intention θ=0.7 (for example, 70% of people move to exit A) is correct as a result. As illustrated in FIG. 6, at a first simulation with an elapsed time of zero seconds, simulation according to the behavior intentions θ that have been randomly set in advance is performed. Therefore, an estimated value of the behavior intention θ is about 0.5 and is far from the correct answer 0.7. However, as the time elapses, the observation data 33 is acquired from the observation device 100, and the simulation result data 32 is evaluated using the observation data 33, and the estimated value of the behavior intention θ gradually approaches the correct answer.

Figure 7:
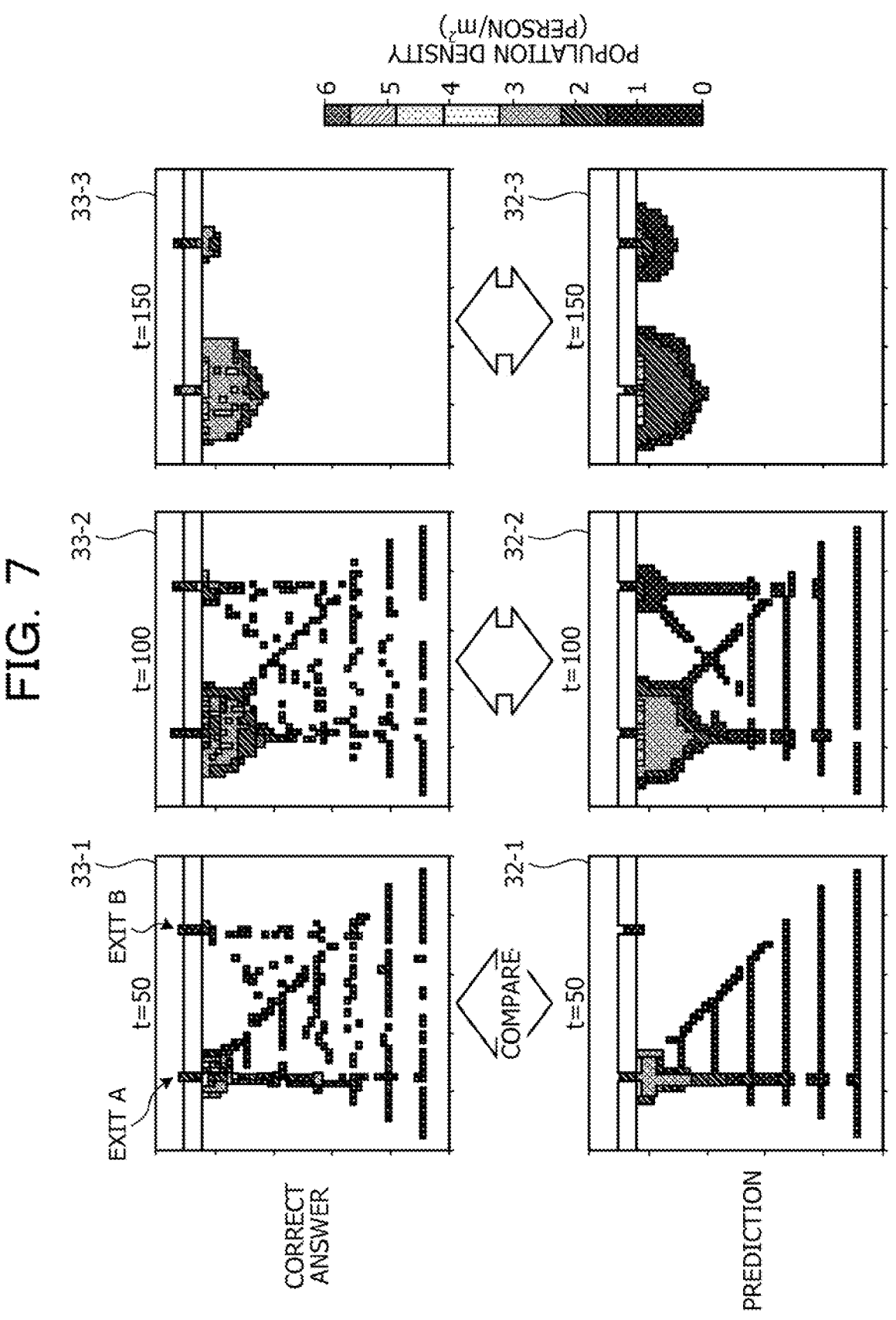
FIG. 7 is a diagram illustrating an example of a density map group according to the first embodiment.

Next, a transition according to a density map will be described. FIG. 7 is a diagram illustrating an example of a density map group according to the first embodiment. The density map group illustrated in the upper portion of FIG. 7 includes each piece of observation data 33-1, 33-2, and 33-3 of a flow of people after elapsed times of 50 seconds, 100 seconds, and 150 seconds from the start of the observation of the flow of people by the observation device 100. On the other hand, the density map group illustrated in the lower portion of FIG. 7 includes each piece of simulation result data 32-1, 32-2, and 32-3 indicating simulation results of the flow of people after the elapsed times of 50 seconds, 100 seconds, and 150 seconds from the start of the observation of the flow of people by the observation device 100.

As illustrated in FIG. 7, the prediction device 10 compares the simulation result data 32 with the observation data 33 until the elapsed time of 50 seconds and evaluates the simulation result data 32. Then, the current state of the flow of people and the behavior intention θ are estimated from the simulation result data 32 and are used for simulation with the next elapsed time and prediction. As a result, the prediction device 10 can make the simulation result data 32 closer to the observation data 33, and can improve the accuracy of predicting the flow of people.

[Flow of Processing]

Figure 8:
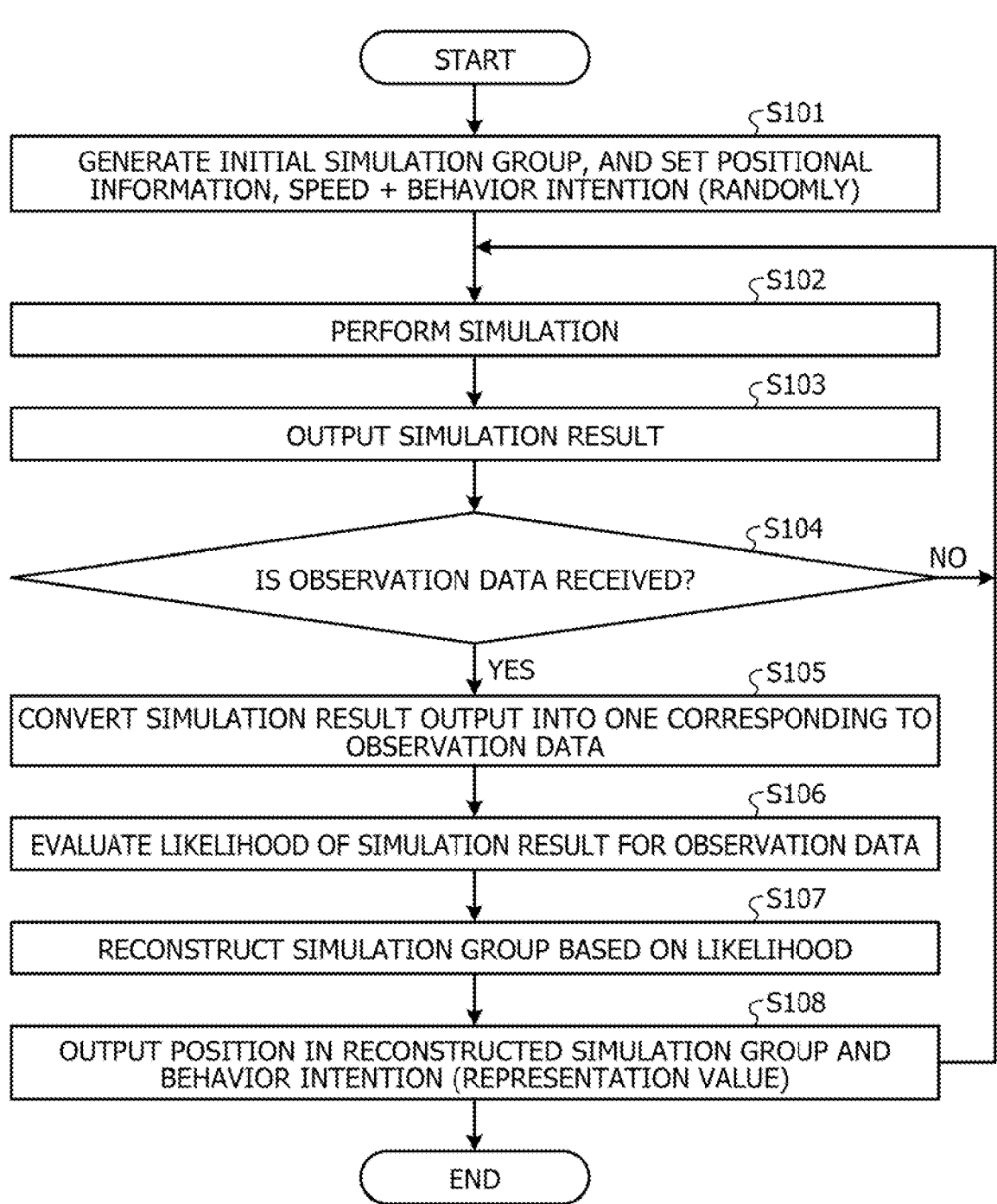
FIG. 8 is a flowchart illustrating an example of a flow of prediction processing according to the first embodiment.

Next, a flow of the prediction processing of the flow of people by the prediction device 10 will be described with reference to the flowchart in FIG. 8. FIG. 8 is a flowchart illustrating an example of the flow of the prediction processing according to the first embodiment.

First, the prediction device 10 randomly sets simulation parameters such as positional information, moving speeds, or behavior intentions θ of people in a predetermined area such as a station or a passage where a flow of people is estimated, as generation of an initial simulation group (step S101). Note that, various patterns, for example, 500 patterns and the like of the behavior intentions θ may be randomly set.

Next, the prediction device 10 simulates prediction of a flow of people by inputting each of the simulation parameters set in step S101 into the algorithm or the simulation model of the existing technique (step S102). Note that the simulation may be performed for each behavior intention or may be regularly or irregularly performed, for example. Furthermore, the flow of people to be predicted may be a flow of people with a predetermined elapsed time such as 30 seconds later or 50 seconds later.

Next, the prediction device 10 outputs the flow of people simulated for each elapsed time as a simulation result (step S103).

Next, in a case where the prediction device 10 does not receive the observation data with the elapsed time simulated in step S102 from the observation device 100 (step S104: No), the procedure returns to step S102, and the prediction device 10 predicts a flow of people with a next elapsed time.

On the other hand, in a case of receiving the simulated observation data with the elapsed time (step S104: Yes), the prediction device 10 converts the simulated flow of people output in step S103, for example, into a density map corresponding to the received observation data (step S105). Note that, in a case where a format of the density map of the observation data is known in advance, the prediction device 10 may convert the simulated flow of people into the density map and output the density map, for example, when the simulation result is output in step S103. In this case, naturally, the conversion into the density map in step S105 does not need to be performed again.

Next, the prediction device 10 calculates and evaluates a likelihood of the simulation result for the observation data (step S106). This is, for example, processing for calculating a reciprocal of the error between the density map of the observation data and the density map of the simulated flow of people as a likelihood and evaluating the simulation result based on the likelihood. Furthermore, the simulation result may be evaluated for each behavior intention that is the basis of the simulated flow of people.

Next, the prediction device 10 reconstructs a simulation group based on the likelihood of the simulation result (step S107). This is, for example, processing for selecting the simulation result based on the likelihood and estimating the underlying behavior intention θ, and then, setting a next simulation parameter. For example, the prediction device 10 sets, for example, the behavior intention θ between 0.1 to 1.0 as an initial value in step S101 and sets the behavior intention θ of the next simulation parameter between 0.5 and 0.7 in a case where the behavior intention θ with the highest likelihood is 0.6. Note that each value of the behavior intention θ described here is merely an example. Furthermore, other simulation parameters such as positional information or moving speeds of people may be reconstructed based on the observation data.

Next, the prediction device 10 outputs the simulation parameters such as the positional information, the moving speeds, or the behavior intentions θ of the people in the reconstructed simulation group (step S108). Then, returning to step S102, the prediction device 10 re-simulates the prediction of the flow of people by inputting the simulation parameters output in step S108 into the algorithm or the simulation model of the existing technique. Note that, in a case where the simulation is not performed any more, the prediction processing illustrated in FIG. 8 ends without returning to step S102.

[Effects]

As described above, the prediction device 10 simulates the flow of people based on the plurality of behavior intentions of the people, evaluates the simulated flow of people based on the observation data 33 of the flow of people, and predicts the flow of people based on the evaluation result of the simulated flow of people.

As a result, the prediction device 10 can simulate the flow of people from the plurality of behavior intentions of the people, estimate the state of the flow of people and the behavior intention by evaluating the simulation result with the observation data, predict the flow of people based on the evaluation result of the simulation, and improve the accuracy of predicting the flow of people.

Furthermore, the processing for evaluating the simulated flow of people executed by the prediction device 10 calculates the likelihood of the simulated flow of people as an evaluation result, based on the error between the observation data 33 and the simulated flow of people.

As a result, the prediction device 10 can improve the accuracy of predicting the flow of people.

Furthermore, the prediction device 10 generates the second density map from the position of each person in the simulated flow of people, based on the observation data 33 that is the first density map of people and calculates the error based on the first density map and the second density map.

As a result, the prediction device 10 can improve the accuracy of predicting the flow of people.

Furthermore, the prediction device 10 estimates the state of the flow of people and the behavior intention based on the evaluation result, and the processing of simulating the flow of people based on the behavior intention executed by the prediction device 10 includes the processing of simulating the flow of people based on the estimated behavior intention.

As a result, the prediction device 10 can further improve the accuracy of predicting the flow of people.

[System]

A processing procedure, a control procedure, a specific name, and information including various types of data and parameters indicated in the descriptions above or in the drawings may be optionally changed unless otherwise specified. Furthermore, the specific examples, distributions, numerical values, and the like described in the embodiment are merely examples, and may be optionally changed.

Furthermore, each component of each device illustrated in the drawings is functionally conceptual, and does not necessarily have to be physically configured as illustrated in the drawings. For example, specific forms of distribution and integration of individual devices are not limited to those illustrated in the drawings. For example, all or a part thereof may be configured by being functionally or physically distributed or integrated in any units depending on various types of loads, usage situations, or the like. Moreover, all or any part of individual processing functions performed by each device may be implemented by a central processing unit (CPU), a graphics processing unit (GPU), and a program analyzed and executed by the CPU and the GPU, or may be implemented as hardware by wired logic.

[Hardware]

Figure 9:
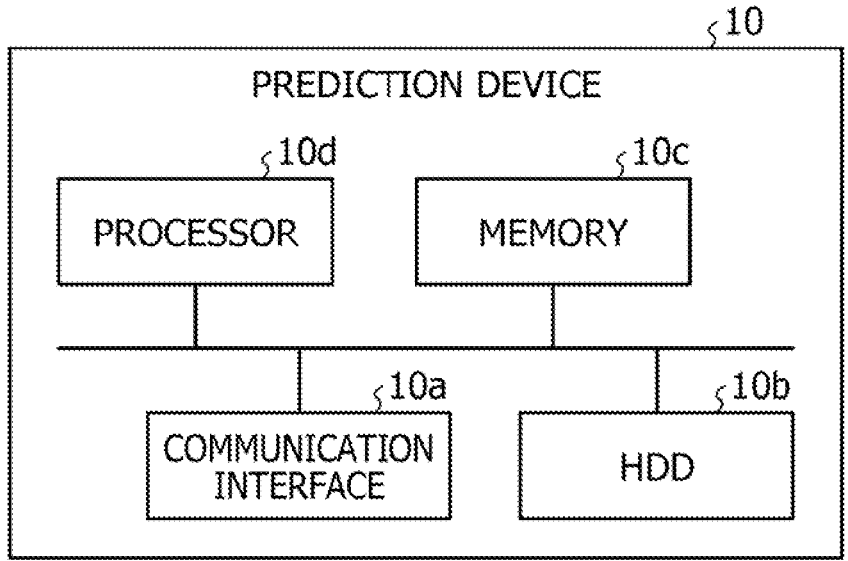
FIG. 9 is a diagram for explaining an exemplary hardware configuration.

FIG. 9 is a diagram for explaining an exemplary hardware configuration. As illustrated in FIG. 9, the prediction device 10 includes a communication interface 10a, a hard disk drive (HDD) 10b, a memory 10c, and a processor 10d. Furthermore, the units illustrated in FIG. 9 are mutually connected by a bus or the like.

The communication interface 10a is a network interface card or the like, and communicates with another server. The HDD 10b stores a program that operates the functions illustrated in FIG. 4, and a DB.

The processor 10d is a hardware circuit that reads, from the HDD 10b or the like, a program that executes processing similar to that of each processing unit illustrated in FIG. 4 and loads it in the memory 10c to operate a process for implementing each function described with reference to FIG. 4 or the like. For example, this process executes a function similar to that of each processing unit included in the prediction device 10. For example, the processor 10d reads, from the HDD 10b or the like, a program having a function similar to that of the simulation unit 41, the estimation unit 42, or the like. Then, the processor 10d executes a process that executes processing similar to that of the simulation unit 41, the estimation unit 42, or the like.

In this manner, the prediction device 10 operates as an information processing device that executes operation control processing by reading and executing the program that executes processing similar to that of each processing unit illustrated in FIG. 4. Furthermore, the prediction device 10 may also implement functions similar to those of the embodiment described above reading a program from a recording medium by a medium reading device and executing the read program. Note that programs referred to in other embodiments are not limited to being executed by the prediction device 10. For example, the present embodiment may be similarly applied to a case where another computer or server executes the program, or a case where these cooperatively execute the program.

Furthermore, the program that executes processing similar to that of each processing unit illustrated in FIG. 4 may be distributed via a network such as the Internet. Furthermore, this program may be recorded in a computer-readable recording medium such as a hard disk, a flexible disk (FD), a compact disc read only memory (CD-ROM), a magneto-optical disk (MO), or a digital versatile disc (DVD), and may be executed by being read from the recording medium by a computer.

Second Embodiment

Incidentally, while the embodiment of the present disclosure has been described above, the present disclosure may be carried out in a variety of different modes in addition to the embodiment described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a prediction program that causes at least one computer to execute a process, the process comprising:

generating a first simulation group including a plurality of simulations of a flow of people, each of the simulations being based on a plurality of hypothetical behavior intentions of people;

acquiring observation data of an actual flow of people at a first time point, the observation data being in a form of a first density map;

for each of the simulations in the first simulation group, generating a second density map from the simulated flow of people at the first time point;

evaluating each of the simulations by calculating a likelihood of the flow of people based on an error between the first density map and the respective second density map; and estimating, based on the likelihoods, a behavior intention that is a basis of a simulation evaluated as being close to the observation data;

constructing a second simulation group for a subsequent time point by selecting and updating the simulations based on the behavior intention; and predicting a future flow of people at the subsequent time point by executing the second simulation group.

2. A prediction method for a computer to execute a process comprising:

generating a first simulation group including a plurality of simulations of a flow of people, each of the simulations being based on a plurality of hypothetical behavior intentions of people;

acquiring observation data of an actual flow of people at a first time point, the observation data being in a form of a first density map;

for each of the simulations in the first simulation group, generating a second density map from the simulated flow of people at the first time point;

evaluating each of the simulations by calculating a likelihood of the flow of people based on an error between the first density map and the respective second density map;

estimating, based on the likelihoods, a behavior intention that is a basis of a simulation evaluated as being close to the observation data;

constructing a second simulation group for a subsequent time point by selecting and updating the simulations based on the behavior intention; and predicting a future flow of people at the subsequent time point by executing the second simulation group.

3. A prediction device comprising:

one or more memories; and one or more processors coupled to the one or more memories and the one or more processors configured to:

generate a first simulation group including a plurality of simulations of a flow of people, each of the simulations being based on a plurality of hypothetical behavior intentions of people, acquiring observation data of an actual flow of people at a first time point, the observation data being in a form of a first density map;

for each of the simulations in the first simulation group, generating a second density map from the simulated flow of people at the first time point;

evaluate each of the based on an error between the first density map and the respective second density map, estimate, based on the likelihoods, a behavior intention that is a basis of a simulation evaluated as being close to the observation data, construct a second simulation group for a subsequent time point by selecting and updating the simulations based on the behavior intention, and predict a future flow of people at the subsequent time point by executing the second simulation group.

* * * * *